United States Patent [19]

Stern

[11] Patent Number: 4,713,217

[45] Date of Patent: Dec. 15, 1987

[54] NICKEL BASE BRAZING ALLOY AND METHOD

[75] Inventor: Marvin J. Stern, Seattle, Wash.

[73] Assignee: Alloy Metals, Inc., Troy, Mich.

[21] Appl. No.: 617,287

[22] Filed: Jun. 4, 1984

[51] Int. Cl.[4] ............................................. C22C 19/05
[52] U.S. Cl. ................................. 420/452; 228/263.13
[58] Field of Search ............................... 420/442, 452; 228/263.13

[56] References Cited

U.S. PATENT DOCUMENTS 2,714,760  8/1955  Boam et al. ......................... 420/452

Primary Examiner—R. Dean
Attorney, Agent, or Firm—Cullen, Sloman, Cantor, Grauer, Scott & Rutherford

[57] ABSTRACT

A nickel base brazing alloy, particularly suitable for diffusion brazing of superalloys, including gamma prime nickel base superalloys. The improved brazing alloy consists essentially of the following in weight percent: 12 to 14% chromium, 1 to 3.5% boron, 1.5 to 5% iron, less than 0.06% carbon, and the balance nickel. The brazing alloy and method of this invention is able to fill gaps in the brazed joint up to 0.02 inches, without adversely affecting the joint microstructure. The resultant microstructure of the brazed joint exhibits minor-secondary phase of ultrafine spherical secondary precipitates, in a predominant solid solution matrix resulting in improved ductility, high temperature oxidation and sulfidation resistance and elimination of the requirement for pressure brazing fixtures.

7 Claims, No Drawings

NICKEL BASE BRAZING ALLOY AND METHOD

FIELD AND BACKGROUND OF THE INVENTION

The present invention relates to an improved nickel base brazing alloy, particularly suitable for diffusion brazing superalloys, including gamma prime superalloys and a method of nonpressure diffusion brazing using the improved brazing alloy of this invention.

Diffusion brazing relies upon solid-state diffusion or movement of metal atoms across the interface of the brazed joint between the brazing alloy and the base metals. It necessarily follows that diffusion brazing alloys are formulated to complement the chemistry of the parts to be joined. Diffusion brazing allows are thus generally nickel, iron or cobalt base alloys, depending upon the composition of the parts to be joined. High strength superalloys have presented a particular problem for diffusion brazing because of the limited wettability. The problem is to formulate a diffusion brazing alloy which complements the base metals having the requisite properties including microstructure and which may be brazed at temperatures low enough for commercial application. In general, high brazing temperatures adversely affect the properties of the brazed joint.

Reference is made herein to my copending application for U.S. patent filed Dec. 1, 1982, Ser. No. 445,818, now U.S. Pat. No. 4,507,264, which discloses a nickel base brazing alloy including chromium, tantalum, boron, aluminum and a rare earth, preferably yttrium or lanthanum. The improved brazing alloy of this invention has similar concentration of chromium but differs in other material respects and permits lower temperature brazing and improved wetting. In addition to the prior art patents cited in my above referenced copending application, the prior art includes commercial diffusion brazing alloys having greater concentrations of chromium, without iron. These commercial alloys do not, however, exhibit the improved microstructure of the brazing alloy of the present invention, as described more fully hereinbelow. Further, the elimination of silicon eliminates the precipitation of secondary phases of silicon which may result in hard spots and lack of uniformity in the microstructure of the brazed joint.

The applicant also previously developed a nickel base commercial brazing alloy including similar concentrations of chromium and iron, with extra low carbon, but with a higher level of boron and also including silicon for improved braze wetting, as described below. This alloy is not, however, suitable for many diffusion brazing applications, especially thin sections, where joint ductility and strength are critical, nor on wide gap conditions where the silicon does not go into solid solution. Further, the brazing temperature of this alloy is relatively high, about 2100° F. This alloy also has a very wide spread between the solidus and liquidus temperatures, making the alloy more sensitive and difficult to control when "superheating" above 2100° F. is utilized, e.g., diffusion-brazing of MM-002° blade components at 2175° to 2225° F., the alloy's primary secondary solution treatment temperature. It was, therefore, determined that a more sluggish flowing, silicon-free braze alloys would be required for use on superalloys at these higher braze temperatures.

Conventional diffusion brazing alloys require a gap in the parts to be joined of less than 0.002 inches to get a good or acceptable microstructure. This limitation handicaps and limits joint design freedom and braze flow, requiring preplaced braze foils or tapes. In fact, comemrcial applications in the aerospace industry have gaps of 0.002 to 0.006 inches which results in a poor microstructure with conventional brazing alloys. Further, microhardness surveys of the brazed joint with conventional diffusion brazing alloys exhibit coarse, brittle "Chinese script" borides as secondary phases and often the gaps are not filled. To obtain an acceptable braze, it is necessary to use a long brazing cycle at excessive temperatures or a post braze soak of as much as 24 hours, or more. Further, a pressure fixture is recommended to obtain an optimum microstructure. The brazing alloy of the present invention eliminates the requirements for a pressure fixture and is capable of brazing gaps of 0.020 inches or more, without adversely affecting the joint microstructure.

SUMMARY OF THE INVENTION

The brazing alloy of the present invention is suitable for high temperature brazing and diffusion brazing of superalloys, at 2225° F., including gamma prime strengthened superalloys as well as stainless steels, carbon and low alloy steels at 1975° F. As brazed, the microstructure of the joint includes ultrafine precipitates surrounded and separated by a fine, thick, ductile solid solution interface. The as brazed joint has improved ductility, improved high temperature oxidation and sulfidation resistance and eliminates the requirement for pressure brazing fixtures.

When brazing is followed by a short diffusion cycle, e.g. four hours at 1975° F., the joint becomes substantially 100% homogeneous in both feed and exit fillets, as well as the joint interface, resulting in improved ductility, fatigue and stress rupture properties, increased remelt temperature, and shear strength, as will be understood by those skilled in the art.

The nickel base brazing alloy of this invention consists essentially of the following composition in weight percent:
Chromium: 12 to 14%
Boron: 1 to 3.5%
Iron: 1.5 to 5%
Nickel: Balance The brazing alloy preferably includes less than 0.06% carbon, more preferably less than 0.03% carbon, and may include incidental impurities and additions of less than about 0.05%.

The more preferred embodiment of the brazing alloy of this invention includes 1.5 to 2.5% boron and 3 to 4.5% iron. The concentration of boron appears to have an affect upon the applicability of the brazing alloy. For example, the most preferred embodiment of the brazing alloy of the present invention has a nominal concentration of boron of about 2% and is particularly suitable for joining honeycomb sections of Inco 617, wherein the core and face sheets have a thickness of 0.002 to 0.005 inches, respectively, such as used in alternate thermal panels for the space shuttle. This alloy brazes at 1975° to 2050° C. and is particularly suitable for brazing stainless steels, e.g. AISI-316, 304, etc; superalloys, e.g. Inco 625, 617 and 713LC and Mar-M; and low alloy steels, e.g. 4130. Short post brazing diffusion cycles, e.g. three to four hours, may be used for superalloys and stainless steels as the "as brazed" microstructure is predominantly a solid solution in the interface areas. Another embodiment of the brazing alloy of this invention has a nominal concentration of boron of about 1% and is particularly suitable for non-erosive brazing and diffusion brazing of thin section superalloys, including Hastelloy X, Inco 625, Hastelloy, etc. and diffusion brazing many superalloys at a temperature of 1975° F. to 2100° F. or Mar-M 246 at its solution temperature of 2225° F., followed by short post braze diffusion cycles at 2175° F. for three to four hours.

The more commercial embodiment of the brazing alloy of this invention, having a nominal concentration of boron of about 2%, has the following composition, in weight percent:
Chromium: 12 to 13.5%
Boron: 1.7 to 2.2%
Iron: 3 to 4%
Nickel: Balance
wherein the concentration of carbon is preferably less than about 0.03%. The brazing alloy may include impurities less than about 0.03%, e.g. Mn, s, P, Al, Ti and Zr and normally less than 1% Co from the nickel base. The nominal composition of one preferred embodiment includes 13% chromium, 2% boron, 3.5% iron and the balance nickel. Another preferred embodiment includes 12% chromium, 1.8% boron, 3.5% iron and the balance nickel. The embodiment of the brazing alloy having a nominal concentration of about 1% boron is 13% chromium, 1% boron, 3.5% iron and the balance nickel, also preferably including less than about 0.03% carbon. It will be understood by those skilled in the art that in commercial practice the concentration of chromium will be ±0.5% chromium, ±0.2% boron and ±0.5% iron.

The brazing alloy of the present invention is silicon free and essentially eutectic, exhibiting a very narrow spread between the solidus and liquidus temperatures and making the alloy particularly suitable for diffusion brazing. Differential thermal analyses of the brazing alloy of this invention establishes a spread between the liquidus and solidus temperatures of only about 50° F. or less, compared to 150° to 350° F. for similar alloys including silicon. This substantially reduces the required diffusion time for the brazed joint and makes the brazing alloy less sensitive to gap and the process cycle in diffusion brazing applications and resulting in a more uniform and improved microstructure. The improved microstructure of the as brazed joint with the brazing alloy of this invention has a minor secondary phase, which is fine grained and very uniform. The primary phase is comprised primarily of alpha nickel, exhibiting large ductile eyebrow loops having uniform microstructure. The secondary precipitates in narrow gap joints are very narrow, uniform and include primarily nickel chromium and iron borides. This secondary phase is ultrafine, surrounded and separated by a thick and ductile solid solution interface. Further, as described, the brazing alloy of the present invention is capable of brazing gaps of 0.020 inches, or greater with improved uniform and fine microstructure. This permits the use of brazing powders and external reservoir feeding, which is not possible in most applications with the prior art brazing alloys which need interface preplacement. Other advantages and meritorious features will be more fully understood from the following detailed description of the preferred embodiments and the appended claims.

DESCRIPTION OF THE PREFERRED EMBODIMENTS AND METHOD OF THE INVENTION

Having generally described the compositions of the brazing alloy of this invention, the preferred embodiments will now be described with reference to specific examples comparing brazed joints formed with the brazing alloy of this invention and the prior art. In each of the following examples, the composition of the brazing alloy was formulated, melted, and the molten alloy was atomized in an inert atmosphere or a vacuum. As described above, the brazing alloy may then be applied to the joint in a fine powder or paste form, or the brazing alloy may be applied in a continuous tape, as will be understood by those skilled in the art. The joint and brazing alloy is then heated in a braze furnace, forming a brazed joint, which may be followed by a post-braze diffusion heat treatment cycle. The brazed joint was then cross-sectioned and the microstructure examined and described hereinbelow.

EXAMPLE 1

A brazing alloy having the following composition in weight percent was formulated:
Chromium: 13.11%
Boron: 1.19%
Iron: 3.58%
Carbon: 0.009%
Nickel: Balance This composition was found to have a solidus temperature of 1065° C. or 1949° F. and a liquidus temperature of 1092° C. or 1998° F.

The joint was a U-Tee joint of Inconel 625. The brazing alloy was applied in a powdered form to the U-Tee joint and brazed in an argon furnace at 2100° F. for thirty minutes. The furnace was then cooled to 1975° F. and the post braze diffusion cycle was held for three hours. The brazed joint was then sectioned through the fillet area and photomicrographs established that the braze was a uniform 100% solid solution free of secondary precipitates.

EXAMPLE 2

A brazing alloy having the following composition was formulated:
Chromium: 13.3%
Boron: 1.8%
Iron: 3.54%
Carbon: 0.02%
Nickel: Balance This composition of the brazing alloy had a solidus temperature of 1067° C. or 1953° F. and a liquidus temperature of 1080° C. or 1976° F.

The brazed joint was a U-tee joint of Hastelloy X. Hastelloy X is a nickel, chromium, molybdenum alloy strengthened with iron and cobalt. The brazing alloy was applied in a powder form to the U-tee joint and brazed in an argon furnace at a temperature of 1975° F. for thirty minutes. Sections were made to study the as-brazed microstructure and the balance of the specimen replaced in the vacuum furnace for PBD (post-braze diffusion) studies. The furnace was then reset to 1975° F. and the post-braze diffusion cycle was held for three hours. The as-brazed joint was then sectioned through the fillet area and the photomicrographs established that the braze prior to the post braze diffusion cycle was nearly a 100% solid solution of alpha nickel, however, the braze included some very fine secondary phases of nickel, iron, chromium and boron. Following the post brazed diffusion cycle, the secondary phases were eliminated and the braze was a uniform 100% solid solution, free of secondary precipitates.

EXAMPLE 3

A brazing alloy having the following composition in weight percent was formulated:
Chromium: 13.13%
Boron: 1.97%
Iron: 3.45%
Carbon: 0.020%
  Nickel: Balance This composition had a solidus temperature of 1067° C. or 1953° F. and a liquidus temperature of 1080° C. or 1976° F.

The joint was a U-tee joint of Inconel 625. The brazing alloy was applied in a powder form to the U-tee joint and brazed in an argon furnace at 2050° F. for thirty minutes. The furnace was then cooled to 1975° F. and the postbrazed diffusion cycle was held for three hours. The brazed joint was then sectioned through the fillet area and photomicrographs established that the braze included a solid solution zone at the interface between the parts joined with a thick solid solution at the fillet interface and a very uniform matrix with fine rounded borides in the matrix secondary phase, providing an excellent brazed joint with good toughness.

EXAMPLE 4

A brazing alloy having the following composition in weight percent was formulated:
Chromium: 12.19%
Boron: 2.08%
Iron: 3.39%
Carbon: 0.010
Nickel: Balance This composition had a solidus temperature of 1925° F. and a liquidus temperature of 1994° F.

The joint was formed of a Hastelloy X base and a 304 stainless steel washer. The brazing alloy was applied in a powder form to the joint and vacuum braze at 2025° F. for twenty minutes. The brazed joint was then sectioned and examined as described above. A further sample as described above was subjected to a postbraze diffusion cycle for four hours at 1975° F. The braze, prior to the postbraze diffusion cycle, included a secondary matrix in the feed fillet consisting of alpha nickel spheres in a very fine matrix and the balance being a solid solution. These spheres were quite soft and measured RB 76–80 micro-hardness. This structure is unique in any nickel base braze alloy studied to date and is one of the principal claims of this patent application. After the diffusion cycle, the brase was a substantially 100% solid solution of alpha nickel. A hardness survey indicated that the hardness was substantially uniform across the braze and an exceptionally soft, RB 80.

EXAMPLE 5

A brazing alloy having the following composition in weight percent was formulated:
Chromium: 13.71%
Boron: 2.57%
Iron: 3.29%
Carbon: 0.027%
Nickel: Balance This composition had a solidus temperature of 1013° C. or 1855° F. and a liquidus temperature of 1060° C. or 1940° F.

The first braze was a U-tee joint of Hastelloy X. The brazing alloy was applied in a powder form to the U-tee joint and vacumn brazed at a temperature of 2050° F. for twenty minutes. The solid solution interface had a very fine microstructure, even at high magnifications. The secondary matrix structure was very fine and spheridized. A microhardness survey was also run across the braze which established that the hardness was substantially uniform across the braze and the joint had good ductility.

The same brazing alloy was used to braze a yoke assembly of 416 stainless steel, wherein the joint was brazed at 1975° F. for twenty minutes, without a post-braze diffusion cycle. The fillet area included a fine spheridized structure including nickel chrome and nickel iron chrome solid solutions. It will be understood by those skilled in the art that conventional nickel base brazing alloys cannot be used to braze 416 stainless steel as the braze generally becomes porous resulting in a poor microstructure.

Other examples of the brazing alloy of this invention were formulated and tested by brazing joints of Hastelloy X and similar superalloys. For example, a brazing alloy having the following composition in weight percent was formulated:
Chromium: 12.87%
Boron: 2.19%
Iron: 3.29%
Carbon: 0.011%
Nickel: Balance.

The brazing alloy exhibited similar properties to the brazing alloys of this invention described above, including an improved microstructure and improved ductility. Other examples of the brazing alloy of the present invention actually formulated which exhibited the improved microstructure and physical properties of the brazing alloy of this invention are as follows. A brazing alloy having the following composition in weight percent was formulated and brazed:
Chromium: 13.32%
Boron: 3.32%
Iron: 3.8%
Carbon: 0.021%
Nickel: Balance.

Another example of the brazing alloy of this invention included 13.45% chromium, 2.89% boron, 2.01% iron, 0.05% carbon and the balance nickel. It is believed that these brazing alloys compositions illustrate the range of compositions which exhibit the desired improved microstructures and properties of this invention.

It has been found that the concentrations of chromium of less than 12% by weight results in inferior corrosion resistance. Alloy composition having concentrations of chromium greater than about 15% are not as tough and the resultant brazed joints are generally too hard and not as ductile. The preferred concentration of chromium results in high temperature oxidation and sulfidation resistance and resistance to chemical corrosion. It has also been found that boron is a critical temperature suppressant in the brazing alloy of this invention and improves the shear strength and stress rupture of the brazed joints in the concentrations covered by this patent application. Concentrations of boron of less than about 0.75% results in a melting temperature which is generally too high for most commercial applications. Concentrations of boron greater than about 3.5%, when brazed, form brittle borides of nickel, chromium, and iron. Greater concentrations of boron also diffuse excessively into the base metal, which may be detrimental to the brazed joint, especially in the joining of thin section components.

It is believed that the iron controls the cross diffusion between the braze alloy and the base metal in the brazing alloy of this invention as well as forming borides and adding to the alloy's solid solution strengthening. Concentrations of iron of about 1.5% to 4.0% blocks detrimental cross-diffusion. Concentrations of iron greater than about 5%, however, results in excessive precipitates with boron and carbon, resulting in embrittlement of the joint.

Having described the preferred compositions of the brazing alloy of this invention and the preferred method of brazing, it is now possible to compare the brazing alloy of this invention with some present or commercial nickel based brazing alloys, which are described more fully in the following examples.

EXAMPLE 6

AMDRY 770 is a commercial brazing alloy offered by the assignee of the present invention although this alloy is generally not considered a diffusion brazing alloy. AMDRY 770A was formulated having the following composition in weight percent:
Chromium: 7.12%
Boron: 3.13%
Iron: 3.13%
Silicon: 4.25%
Carbon: 0.022%
Nickel: Balance This composition had a solidus temperature of 1760° F. and a liquidus temperature of 1881° F. It is noted that the difference between the solidus and liquidus temperatures is over 120° F., whereas the difference between the solidus and the liquidus temperatures of the brazing alloys of the present invention is less than about 50° F.

The brazing alloy was applied to the joint to be brazed in a powdered form, as described above, and the joint was brazed in an argon furnace.

In one test, this brazing alloy was utilized to braze a U-tee joint of Hastelloy X, wherein the parts were brazed in an argon furnace at 1950° F. for twenty minutes. The resultant brazed joint includes an alpha nickel solid solution at the interface between the braze and the face members, however, the braze included an extremely rough exit fillet, which included voids and coarse secondary precipitates of nickel silicides and nickel, iron chrome borides. The secondary phase included multiple cooling cracks in these brittle continuous phases. This composition was also utilized to braze a U-tee joint of Hastelloy X, wherein the joint was brazed in hydrogen at 1930° F. for thirty minutes. The brazed joint included coarse secondary precipitates in the braze in the exit fillet, which are subject to cracking during cooling. Finally, this composition was utilized to braze a T-section of Inconel 625, wherein the braze included a solid solution of alpha nickel and a secondary phase of coarse borides and silicide precipitates, as described above.

EXAMPLE 7

AMDRY 775 is a commercial nickel base brazing alloy of the assignee of the present invention. AMDRY 775 has the following nominal composition in weight percent:
Chromium: 15.50%
Boron: 3.50%
Carbon: 0.06% or greater
Nickel: Balance A commercial sample of AMDRY 775 was analyzed and found to have the following composition, in weight percent:
Chromium: 15.37%
Boron: 3.95%
Iron: 0.25% (impurity)
Carbon: 0.062%
Nickel: Balance A stainless steel lap flow washer was brazed to a Hastelloy X base, as described above, and cross-sections were made. The braze had three phases, including a solid solution of alpha nickel phase adjacent to each at interface of the base metals, a very coarse and a gross "Chinese script" secondary phase in both the feed and exit fillets. The braze also included a void at the exit fillet and the stainless steel washer showed strong nickel, chromium, boron, bulky grainboundry diffusion into the stainless steel. The secondary phases was relatively coarse. Post brazed diffusion did not eliminate the secondary phases.

EXAMPLE 8

AMDRY 915 is a commercial nickel based brazing alloy available from the Assignee of the present invention. AMDRY 915 has the following nominal compositions, in weight percent:
Chromium: 13%
Boron: 2.8%
Iron: 4%
Silicon: 4%
Carbon: 0.030%
Nickel: Balance A commercial analysis of AMDRY 915 was as follows, in weight percent:
Chromium: 12.65%
Boron: 2.74%
Iron: 4.31%
Silicon: 4.18%
Cobalt: 0.19% (minor trace element from the nickel base)
Carbon: 0.044%
Nickel: Balance A stainless steel lap-flow washer was brazed to a Hastelloy X base, using this alloy, as described above, and the brazed joint was cross-sectioned. The brazed joint included an alpha nickel primary phase, adjacent to the base members, and intermittent fine secondary phases of nickel-iron-chromium silicides, plus nickel-chrome-iron borides. A post-braze diffusion cycle reduced the secondary phases; however, the braze retained considerable secondary precipitates in the 0.006 inch joint interface and fillets.

Based upon the above, the broad composition of the brazing alloy of this invention preferably includes the following, in weight percent: 12–14% chromium, 1–3.5% boron, 1.5–5% iron, less than about 0.06% carbon and the balance nickel. It will be understood, however, that the brazing alloy will necessarily include some impurities and may include additions, including rare earth, up to about 0.05% total, by weight. The most preferred composition of the brazing alloy of this invention, however, has the following composition in weight percent: 12–14% chromium, 1–2.5% boron, 3–4% iron, less than about 0.03% carbon, and the balance nickel. The nominal, or most preferred compositions include about 13% chromium, about 1–2% boron, about 3.5% iron, less than about 0.03% carbon and the balance nickel. In the nominal compositions of the brazing alloy of this invention, the concentration of chromium wall range from about 12.75%–13.25% chromium, the boron concentration will range plus or minus about 0.2%, the iron concentration will range from about 3–4%, with the balance nickel, excluding carbon and impurities.

As described above, the brazing alloy of this invention is capable of filling base metal gaps in the brazed joint up to 0.02 inches and greater, while maintaining a fine grained and uniform secondary phase, which may include ultrafine secondary precipitates of nickel, chromium, iron borides, and the normally 1975°–2050° F. as-brazed microstructure may also include uniform alpha nickel spheres of alpha nickel solution at the joint feed fillet area. The resultant braze is very ductile, strong and provides high temperature oxidation and sulphidation resistance. The brazing alloy of this invention is particularly suitable for diffusion brazing super alloys, including gamma prime super alloys, because the chemistry closely matches the basic chemistry of many super alloys, and the preferred concentration of iron reduces the diffusion of boron across the braze interface. Thus, the diffusion brazing alloy of the present invention exhibits a substantial improvement over the prior art nickel base brazing alloys and provides good flow, joint filling properties when exposed to "superheating" temperatures of 2175°–2225° F. when required to thermally process some super alloys at their primary and secondary solution heat treat temperatures.

I claim:

1. A nickel base brazing alloy suitable for diffusion brazing nickel base superalloys consisting essentially of the following composition in weight percent:
Chromium: 12 to 14%
Boron: 1 to 2.5%
Iron: 3 to 4.5%
Nickel: Balance
the brazing alloy having less than about 0.03% carbon and less than 0.04% incidental impurities and additions.

2. A nickel base brazing alloy particularly suitable for brazing superalloys consisting esentially of the following composition in weight percent:
Chromium: 12.75 to 13.25%
Boron: 1.9 to 2.2%
Iron: 3 to 4%
Nickel: Balance
the brazing alloy having less than about 0.03% carbon and less than 0.03 additions and impurities.

3. A nickel base brazing alloy particularly suitable for brazing superalloys consisting essentially of the following nominal composition in weight percent:
Chromium: 13%
Boron: 2%
Iron: 3.5%
Nickel: Balance
the brazing alloy having less than about 0.03% carbon and incidental impurities and additions of less than 0.03%.

4. A nickel base brazing alloy particularly suitable for brazing superalloys consisting essentially of the following nominal composition in weight percent:
Chromium: 13%
Boron: 1%
Iron: 3.5%
Nickel: Balance
the brazing alloy having less than about 0.03% carbon and less than 0.3% additions and impurities.

5. A nickel base brazing alloy particularly suitable for brazing superalloys consisting essentially of the following nominal composition in weight percent:
Chromium: 12%
Boron: 2%
Iron: 3.5%
Nickel: Balance
the brazing alloy having less than about 0.03% carbon and less than 0.03% additions and impurities.

6. A method of diffusion brazing superalloys without pressure, including forming a joint of superalloys of the gamma prime type, applying a brazing alloy in powdered form to said joint consisting essentially of the following composition in weight percent:
Chromium: 12 to 14%
Boron: 1 to 2.5%
Iron: 1.5 to 5%
Nickel: Balance
the brazing alloy having less than about 0.03% carbon and incidental impurities and additions of less than 0.055; the method including heating the joint of superalloys in a furnace to the brazing temperature of the alloy, followed by a short diffusion cycle in said furnace of 3 to 4 hours.

7. A method of diffusion brazing superalloys without pressure, including forming a joint of superalloys of the gamma prime type, applying a brazing alloy in powdered form to said joint consisting essentially of the following composition in weight percent:
Chromium: 12.75 to 13.25%
Boron: 1.9 to 2.2%
Iron: 3 to 4%
Nickel: Balance
the brazing alloy having less than about 0.03% carbon.

* * * * *

UNITED STATES PATENT AND TRADEMARK OFFICE
CERTIFICATE OF CORRECTION

PATENT NO. : 4,713,217

DATED : December 15, 1987

INVENTOR(S) : Marvin J. Stern

It is certified that error appears in the above-identified patent and that said Letters Patent is hereby corrected as shown below:

Claim 4, line 9, delete "0.3%" and insert therefor -- 0.03%

Signed and Sealed this

Thirty-first Day of May, 1988

Attest:

Attesting Officer

DONALD J. QUIGG

Commissioner of Patents and Trademarks